United States Patent [19]
Lechner et al.

[11] Patent Number: 6,013,968
[45] Date of Patent: Jan. 11, 2000

[54] SYNCHRONOUS MACHINE, IN PARTICULAR GENERATOR FOR MOTOR VEHICLE

[75] Inventors: Juergen Lechner, Eberdingen-Nussdorf; Alexander Shendi, Asperg, both of Germany; Sylvan Briand, Magor, United Kingdom

[73] Assignee: Robert Bosch GmbH, Stuttgart, Germany

[21] Appl. No.: 09/237,989

[22] Filed: Jan. 26, 1999

[30] Foreign Application Priority Data

Jan. 26, 1998 [DE] Germany .................. 298 01 184

[51] Int. Cl.$^7$ ...................................... H02K 1/22
[52] U.S. Cl. .................. 310/263; 310/268; 310/156; 310/181; 310/261; 310/218; 310/45; 310/51; 310/264; 310/191
[58] Field of Search ..................... 310/263, 268, 310/156, 181, 261, 218, 45, 51, 264, 191

[56] References Cited

U.S. PATENT DOCUMENTS

| | | | |
|---|---|---|---|
| 5,519,277 | 5/1996 | York et al. | |
| 5,539,265 | 7/1996 | Harris et al. | 310/263 |
| 5,543,676 | 8/1996 | York et al. | 310/263 |
| 5,578,885 | 11/1996 | Alford et al. | 310/263 |
| 5,747,913 | 5/1998 | Amlee et al. | 310/263 |
| 5,793,144 | 8/1998 | Kusase et al. | 310/263 |
| 5,828,155 | 10/1998 | Adachi | 310/263 |
| 5,892,313 | 4/1999 | Harris et al. | 310/263 |

FOREIGN PATENT DOCUMENTS

| | | |
|---|---|---|
| 89 05 353 | 4/1990 | Germany . |
| 2 281 665 | 3/1995 | United Kingdom . |

Primary Examiner—Nestor Ramirez
Assistant Examiner—Thanh Lam
Attorney, Agent, or Firm—Michael J. Striker

[57] ABSTRACT

A synchronous machine, in particular a generator for a motor vehicle, has an excitation system with a plurality of electrically excited individual poles in a rotor, preferably in form of claw poles which are excited by at least one common excitation coil, wherein for compensation of a magnetic stray flux, permanent magnets are inserted in free spaces between the axially oriented claw poles on the pole plates mounted on the axial ends of the rotors, and the permanent magnets are supported by a holder against centrifugal forces, so that the insertion of the permanent magnets is simplified and facilitated by a simple and inexpensive holder which reduces parts and mounting expenses.

25 Claims, 3 Drawing Sheets

006,013,968

SYNCHRONOUS MACHINE, IN PARTICULAR GENERATOR FOR MOTOR VEHICLE

BACKGROUND OF THE INVENTION

The present invention relates to a synchronous machine, and in particular to a generator for motor vehicles.

Synchronous machines of this type are known in the art. One of such machines is disclosed for example in the German patent document DE 89 05 353 U1. In this machine the permanent magnets located in the free spaces between the oppositely located claw poles are oriented by holding plates against the centrifugal forces and magnetized so that they counteract the stray flux. The holding plates are inserted at the peripheral side in widening of the claw poles and fixed, while they are supported at the side facing the central axis of the machine on a non magnetic sleeve which surrounds the excitation stage. This construction of the permanent magnets requires not only substantial expenses for the parts which depend on the number of poles on the synchronous machines, but also requires a substantial mounting expense for the holding plates. The rotor of the synchronous machine is therefore expensive to manufacture. Moreover, the permanent magnets are not clearly oriented in the axial direction against the axial blow forces.

As shown in U.S. Pat. No. 5,543,676 it is known to insert the U-shaped permanent magnet between the excitation coil and the claw pole, so that the side legs of the permanent magnets are introduced in the free spaces between the claw poles. These permanent magnets extend only to the axial center of the free spaces, since a permanent magnet is inserted from each tip of a claw pole.

Also, a meandering and ring-shaped holder for the permanent magnets is known, which is prefabricated as a unit and during the mounting of the rotor on the pole core is fitted with the excitation winding, before the pole plates are mounted from both axial ends with their claw poles. The claw poles are introduced in the axially open receptacles of the holder as shown in the patent document UK 2 281 665 A. This known holder has a complicated construction and is expensive to manufacture. Moreover, the permanent magnets and the holder itself are not clearly secured against the centrifugal forces and axial blow forces.

SUMMARY OF THE INVENTION

Accordingly, it is an object of the present invention to provide the synchronous machine of the above mentioned general type, which avoids the disadvantages of the prior art.

It is also an object of the present invention to provide a synchronous machine of the above mentioned art with a holder for permanent magnets formed so that it has a simple construction and is simple and inexpensive to produce, and which also is correctly fixable radially and outwardly in a simple manner during mounting of the rotor.

In keeping with these objects and with others which will become apparent hereinafter, one feature of present invention resides, briefly stated, in a synchronous machine in which the holder is formed of two receiving cages each provided with a ring disc, the ring disc is arranged between the inner side of the pole plates and the end side of the excitation coil, strip sections are formed on the ring discs, which per each free space form a receiving chamber for a permanent magnet which is closed at least toward the axial center of the rotor and toward the centrifugally-loaded side of the free space, and the receiving chambers are fixed on the claw poles and/or pole plates.

Alternatively, the holder is composed of two receiving cages each having a ring disc, the ring discs are closed in the axial center of the rotor of the excitation system and abut against one another, edged strip sections are formed on the ring discs which per each free space form a receiving chamber for a permanent magnet which is closed at least toward the axial center of the rotor, toward centrifugally-loaded side of the free space and at least partially toward the excitation call, and the receiving chambers are fixed on the claw poles and/or the pole plates.

The both receiving cages of the holder are produced simply and inexpensively as stamped bending parts and can be formed identically. The permanent magnets can be inserted in the receiving chambers before they are assembled during the mounting of the rotor with the pole plates and the excitation system. Since the receiving cages are composed of non-ferromagnetic weldable material, such as high grade steel, brass, bronze or aluminum, additional welding spots can be used for fixing in order to increase the stability of the holder, and the strip sections of the holder welded with the pole plates or the claw poles.

The formation of the receiving chambers which are closed at three sides and accessible from the outer sides of the pole plates is obtained when on the ring discs of the receiving cages per free space a strip section is welded to be oriented toward the axial center of the rotor or parallel to the machine central axis so that it transits into a radially oriented strip section, and a radially oriented strip section transits into a strip section which is oriented toward the outer sides of the associated pole plates and fixed on the claw poles.

For fixing of the strip section which is loaded with the centrifugal force, the strip sections of the receiving chambers oriented toward the outer sides of the pole plates are held by webs of the claw poles against centrifugal forces. Or the strip sections of the receiving chambers oriented toward the outer side of the pole plates are introduced into grooves of the claw poles, which are arranged in the sides of the claw pole opposite to the strip section. Alternatively, the strip sections of the receiving chambers oriented toward the outer sides of the pole plates are held by holding points of the claw pole against the centrifugal forces.

The receiving chambers in accordance with a further embodiment can be closed on the outer sides of the pole plates. The strip sections of the receiving chambers oriented toward the outer sides of the pole plates are transit into the end sections oriented toward the central axis of the machine, which are welded to the outer sides of the pole plates. Thereby the stability of the holder is improved. The mounting of the rotor is simplified and improved when in accordance with the present invention the receiving cages provided with the permanent magnets are prefabricated and with a pole plate are connected to form two units, and the units are fitted on the excitation system and connected with it.

With the receiving cages abutting against one another with their ring discs in the axial center of the excitation system, the stability of the holder can be increased then the strip sections of the receiving chambers facing the excitation coil are supported on a non-magnetic sleeve which surrounds the excitation coil and is connected with it.

In order to provide the receiving chambers of the receiving cages with permanent magnets, the magnets pairs are utilized with alternatingly differently inclined free spaces and thereby receiving chambers of the receiving cages. They are connected with one another at their end-side edge and are inserted in the adjoining receiving chambers.

For improving the cooling of the synchronous machine, it is proposed in accordance with a further embodiment of the present invention to arrange the receiving cages so that they provide an air gap in the center of the excitation system between the abutting strip sections.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
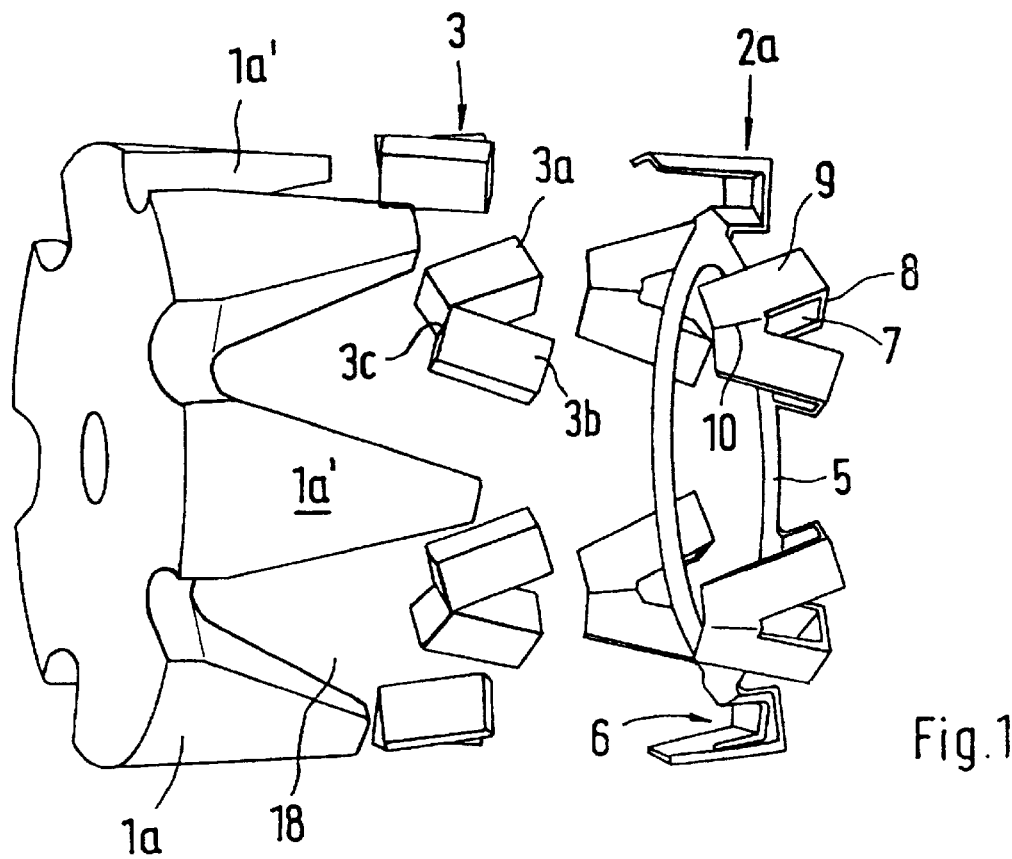
FIG. 1 is a perspective view of a receiving cage for a holder of a permanent magnet or a rotor in accordance with the present invention.
Figure 2:
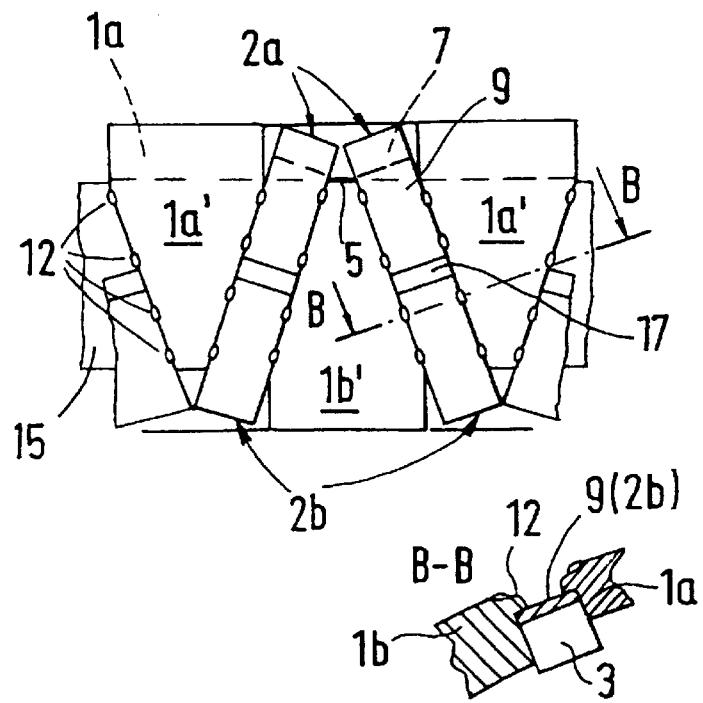
FIG. 2 is a peripheral-side partial view of the rotor with fixation of both receiving cages provided with permanent magnets in accordance with the present invention.

As shown in FIG. 1, permanent magnets 3 are held in receiving cages. Two identical receiving cages 2a and 2b are needed for the holder. They are inserted from both axial ends of the rotor into free spaces 18 between claw poles 1a' and 1b' of pole plates 1a and 2a as shown in FIG. 2.

The receiving cage 2a has a ring disc 5 provided with a plurality of strip sections 7, 8 and 9. The strip sections are formed on the ring disc and bent many times. They are provided per each free space, or in other words per pole, and form a receiving chamber 6 for the permanent magnets 3. Its magnet field is oriented opposite to the stray field between the claw poles 1a' and 1b'. The receiving chambers are laterally open. However, they are closed by the adjoining claw poles 1a' or 1b'. Then the receiving cage 2a with the primary magnets 3 is assembled to form a prefabricated unit and is mounted with an excitation winding 15 and the pole plates 1a, 1b on a rotor shaft with a pole core 16. When the free spaces are inclined alternatingly, then two receiving chambers 6 can be connected with one another in the region of the abutment point on the outer sides of the pole plates 1a and 1b, as identified with reference numeral 10 in FIG. 1. The same is true for the permanent magnets 3 which are connected with one another at an end-side 3c. The permanent magnets 3 can be held in the receiving chamber 6 by adhesive-form-locking or force-transmitting connection.

When both receiving cages 2a and 2b are inserted from the axial ends of the rotor into the free spaces, then in each free space two permanent magnets are arranged one behind the other with an air gap 17 located between them. The strip sections 9 which are oriented to the outer sides of the pole plates 1a and 1b are secured radially against the centrifugal forces. The securing is provided in that the several mortized point locations 12 of the strip portion 9, overlapped and radially supported, as shown in the section BB in FIG. 2.

Figure 3:
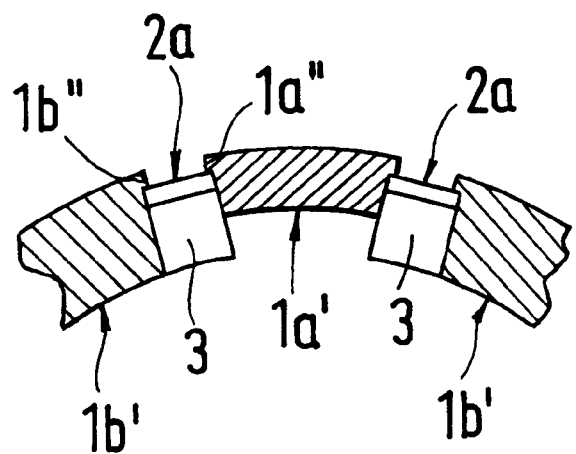
FIG. 3 is a view showing a section of a mounting variant for the receiving cages with the permanent magnets on claw poles.

The receiving chamber 6 with their strip sections 9 oriented toward the outer sides of the pole plates can be also supported by webs 1a" and 1b" of the claw poles 1a' and 1b' against the centrifugal forces. This is shown in FIG. 3.

Figure 4:
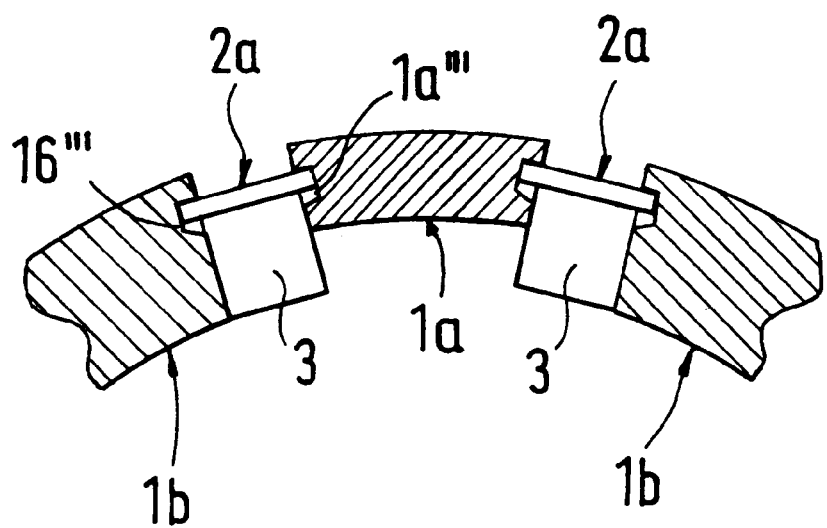
FIG. 4 is a view showing a section of a further fixing variant for the receiving cages with the permanent magnets on the claw poles.

Moreover, the strip portions 9 of the receiving chamber 6 can be also inserted into the grooves 1a'" and 1b'" of the neighboring claw poles 1a' and 1b' and radially exactly fixed. This is shown in FIG. 4.

Figure 5:
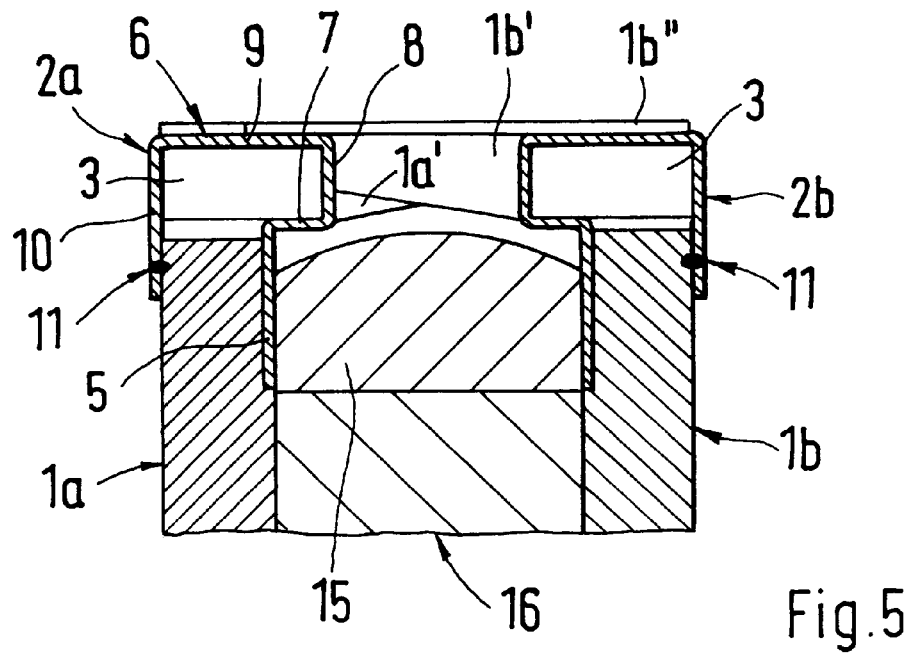
FIG. 5 is a view showing a partial longitudinal section through the rotor with a holder formed in a different manner.

The section of FIG. 5 clearly shows a variant for the insertion of the holder with a magnets 3 in the rotor. An excitation coil 15 is mounted on the pole core 16. The both mirror-symmetrical receiving cages 2a and 2b are arranged with their ring discs 5 between the inner side of the facing pole plates 1a and 1b and the facing end sides of the excitation coil 15. The receiving chamber 6 are formed on the outer edge of the ring discs 5. They are composed at least of several bent strip sections 7, 8, 9 and in the region of the peripheral side of the claw poles 1a and 1b form open receiving chambers 6. The strip sections 7 extend to the axial center of the excitation system and above the excitation coil 15. The strip sections 7 transit into radially oriented strip sections 8, which finally transit into the strip sections 9 oriented toward the outer sides of the pole plates 1a and 1b. The strip sections 9 in FIG. 5 are radially held by webs 1b" of the claw pole 1b'. The receiving edges 6 extend in the free spaces between the claw poles 1a' and 1b'. Each receive cage 2a and 2b with the receiving chamber 6 provided with the permanent magnet 3 extends into each free space. The permanent magnets 3 overlap the pole plates 1a and 1b.

When the strength of the receiving cages 2a and 2b is not sufficient in this embodiment, the strip sections 9 can transit into end strip sections 10. The strip sections 10 are bent in direction toward the machine central axis at the outer sides of the pole plates 1a and 1b and welded with them by welding points identified with reference numerals 11.

Figure 6:
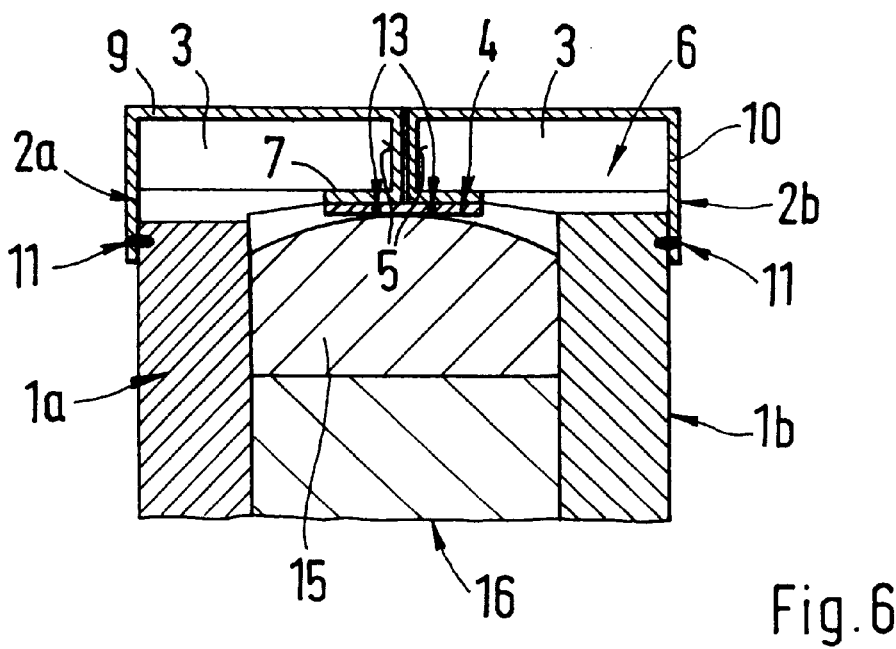
FIG. 6 is a partial longitudinal section with a holder formed in accordance with still a further embodiment.

The receiving cages 2a and 2b can abut against one another with their ring discs 5 in the region of the axial center of the excitation system and enclose the excitation coil 15 as shown in FIG. 6. The strip sections 7 are angled at their inner edges and the ring discs 5 form the radial closure of the receiving chambers 6. Since the strip sections 9 which are firmly located on the claw poles 1a and 1b and oriented toward the outer side of the pole plates 1a and 1b, are bent at the outer edges of the ring discs 5 and transit into the end sections 10. The end sections 10 close the receiving chambers 6 in the region of the outer end sides of the pole plates 1a and 1 b and are welded with them by welding points 11.

In order to increase the strength of the holder, the strip sections 7 of both receiving cages 2a and 2b can be supported on a sleeve 4 and connected with it by mounting points 13. The sleeve 4 is non-magnetic and surrounds the excitation system. The receiving chambers 6 in this design practically cover the entire free space between the claw poles 1a' and 1b' until the outer sides of the pole plates 1a and 1b.

It will be understood that each of the elements described above, or two or more together, may also find a useful application in other types of constructions differing from the types described above.

While the invention has been illustrated and described as embodied in synchronous machine, in particular generator for motor vehicle, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A synchronous machine formed as a generator for a motor vehicle, comprising a rotor; an excitation system including a plurality of electrically excited individual poles provided in said rotor and formed as claw poles excited by at least one excitation coil; a plurality of permanent magnets inserted in free spaces between said claw poles, said poles having pole plates on which said permanent magnets are arranged; a holder which supports and holds said permanent magnets, said holder being composed of two non-magnetic receiving cages each having a ring disc, said ring disc being arranged between inner sides of pole plates and end sides of said excitation coil located between said pole plates, said ring disc being provided with a plurality of bent strip sections forming a receiving chamber for each free space for at least one of said permanent magnets such that it is closed at least toward an axial center of said rotor and toward a centrifugally-loaded side of the free space, said receiving chambers being fixed on elements selected from the group consisting of said claw poles, said pole plates, and both.

2. A synchronous machine as defined in claim 1, wherein said receiving cages are formed as stamped bending parts of a non-magnetic, weldable material selected from the group consisting of high grade steel, brass, bronze and aluminum.

3. A synchronous machine as defined in claim 1, wherein said strip sections include a first strip section provided on each of said ring disc of said receiving cages per each free space, a second strip section which is oriented radially outwardly and into which said first strip sections transits, and a third axial strip section into which said second strip sections transmits and which is oriented toward either sides of facing ones of said pole plates and fixed on said claw poles.

4. A synchronous machine as defined in claim 3, wherein said first strip section is oriented toward the axial center of said rotor.

5. A synchronous machine as defined in claim 3, wherein said first strip sections is oriented parallel to a central axis of the synchronous machine.

6. A synchronous machine as defined in claim 3, wherein said claw poles have webs, said third strip sections being held against centrifugal forces by said webs.

7. A synchronous machine as defined in claim 3, wherein said claw poles have grooves provided in sides of said claw poles which face said third strip sections, said third strip sections being inserted in said grooves.

8. A synchronous machine as defined in claim 3, wherein said third strip sections of said receiving chambers are held on an edge of said claw poles against centrifugal forces by mortised holding points.

9. A synchronous machine as defined in claim 3; and further comprising end sections which are oriented toward a central axis of the synchronous machine and welded with outer end sides of said pole plates, said third strip sections transiting into said end sections.

10. A synchronous machine as defined in claim 1, wherein said receiving cages is provided with said permanent magnets are prefabricated and connected with a respective one of said pole plates so as to form two units fitted on said excitation system and connected with the later.

11. A synchronous machine as defined in claim 1, wherein the free spaces and said receiving chambers of said receiving cages are alternatingly differently inclined, said permanent magnets being assembled in magnet pairs which are connected with one another at an end-side edge and inserted in said receiving chambers abutting against one another.

12. A synchronous machine as defined in claim 1, wherein said receiving cages are arranged so that they leave an air gap in a center of said excitation system between said third strip sections which abut against one another.

13. A synchronous machine formed as a generator for a motor vehicle, comprising a rotor; an excitation system including a plurality of electrically excited individual poles provided in said rotor and formed as claw poles excited by at least one excitation coil; a plurality of permanent magnets inserted in free spaces between said claw poles, said poles having pole plates on which said permanent magnets are arranged; a holder which supports and holds said permanent magnets, said holder being composed of two non-magnetic receiving cages each provided with a ring disc, said ring disc in an axial center of said rotor surrounding said excitation coil and abutting against one another, said ring disc having a bent strip section which per each free space forms a receiving chamber for at least one of said permanent magnets which receiving chamber is closed toward the axial center of said rotor, toward a centrifugally-loaded side of the free space and at least partially toward said excitation coil, said receiving chambers being fixed on elements selected from the group consisting of claw poles, pole plates, and both.

14. A synchronous machine as defined in claim 13, wherein said receiving cages are formed as stamped bending parts of a non-magnetic, weldable material selected from the group consisting of high grade steel, brass, bronze and aluminum.

15. A synchronous machine as defined in claim 13, wherein said strip section includes a first strip section provided on each of said ring discs of said receiving cages per each free space, a second strip section which is oriented radially outwardly and into which said first strip sections transits and a third axial strip section into which said second strip sections transmits and which is oriented toward either sides of facing ones of said pole plates and fixed on said claw poles.

16. A synchronous machine as defined in claim 15, wherein said first strip section is oriented toward the axial center of said rotor.

17. A synchronous machine as defined in claim 15, wherein said first strip sections is oriented parallel to a central axis of the synchronous machine.

18. A synchronous machine as defined in claim 15, wherein said claw poles have webs, said third strip sections being held against centrifugal forces by said webs.

19. A synchronous machine as defined in claim 15, wherein said claw poles have grooves provided in sides of said claw poles which face said third strip sections, said third strip sections being inserted in said grooves.

20. A synchronous machine as defined in claim 15, wherein said third strip sections of said receiving chambers are held on an edge of said claw poles against centrifugal forces by mortised holding points.

21. A synchronous machine as defined in claim 15; and further comprising end portions which are oriented toward a central axis of the synchronous machine and welded with outer end sides of said pole plates, said third strip sections transiting into said end portions.

22. A synchronous machine as defined in claim 13, wherein said receiving cages provided with said permanent magnets are prefabricated and connected with a respective one of said pole plates so as to form two units inserted on said excitation system and connected with the later.

23. A synchronous machine as defined in claim 13; and further comprising a non-magnetic sleeve which surrounds said excitation coil, said strip sections including first strip sections which are supported in said sleeve and connected with said sleeve.

24. A synchronous machine as defined in claim 13, wherein the free spaces and said receiving chambers of said receiving cages are alternatingly differently inclined, said permanent magnets being assembled in magnet pairs which are connected with one another at an end-side edge and inserted in said receiving chambers abutting against one another.

25. A synchronous machine as defined in claim 1, wherein said receiving cages are arranged so that they leave an air gap in a center of said excitation system between said third strip sections which abut against one another.

* * * * *